US009721349B2

(12) United States Patent
Narayanan et al.

(10) Patent No.: US 9,721,349 B2
(45) Date of Patent: Aug. 1, 2017

(54) METHOD AND SYSTEM FOR AUTOMATICALLY COUNTING PHYSICAL OBJECTS WITHIN A PERIPHERY BAND AND AN EXCLUDED REGION

(71) Applicant: Texas Instruments Incorporated, Dallas, TX (US)

(72) Inventors: Sriram Narayanan, Ricardson, TX (US); Russell Rosenquist, Plano, TX (US); Srinath Ramaswamy, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 267 days.

(21) Appl. No.: 14/189,151

(22) Filed: Feb. 25, 2014

(65) Prior Publication Data
US 2014/0241581 A1    Aug. 28, 2014

Related U.S. Application Data

(60) Provisional application No. 61/768,998, filed on Feb. 25, 2013.

(51) Int. Cl.
*G06K 9/00*  (2006.01)
*G06T 7/20*  (2017.01)
*G06T 7/73*  (2017.01)
*G08B 13/18*  (2006.01)

(52) U.S. Cl.
CPC ............ *G06T 7/20* (2013.01); *G06K 9/00771* (2013.01); *G06T 7/73* (2017.01); *G06T 2207/10048* (2013.01); *G06T 2207/30242* (2013.01); *G08B 13/18* (2013.01)

(58) Field of Classification Search
None
See application file for complete search history.

(56) References Cited

U.S. PATENT DOCUMENTS

| 2008/0212099 | A1* | 9/2008 | Chen | G06T 7/20 356/408 |
| 2010/0080548 | A1* | 4/2010 | Peterson | G03B 17/55 396/153 |
| 2011/0037852 | A1* | 2/2011 | Ebling | G06K 9/00778 348/143 |
| 2014/0049647 | A1* | 2/2014 | Ick | G06K 9/00771 348/148 |
| 2014/0241581 | A1* | 8/2014 | Narayanan | G06T 7/20 382/103 |

* cited by examiner

*Primary Examiner* — Tahmina Ansari
(74) *Attorney, Agent, or Firm* — Michael A. Davis, Jr.; Charles A. Brill; Frank D. Cimino

(57) ABSTRACT

A periphery band is around an excluded region. For automatically counting physical objects within the periphery band and the excluded region, an imaging sensor captures: a first image of the periphery band and the excluded region; and a second image of the periphery band and the excluded region. In response to the first image, a first number is counted of physical objects within the periphery band and the excluded region. Relevant motion is automatically detected within the periphery band, while ignoring motion within the excluded region. In response to the second image, a second number is counted of physical objects within the periphery band and the excluded region. In response to determining that a discrepancy exists between the detected relevant motion and the second number, the discrepancy is handled.

18 Claims, 3 Drawing Sheets

METHOD AND SYSTEM FOR AUTOMATICALLY COUNTING PHYSICAL OBJECTS WITHIN A PERIPHERY BAND AND AN EXCLUDED REGION

CROSS-REFERENCE TO RELATED APPLICATION

This application claims priority to U.S. Provisional Patent Application Ser. No. 61/768,998, filed Feb. 25, 2013, entitled Analog Periphery-Sensor Assisted People-Counting System, naming Sriram Narayanan et al. as inventors, which is hereby fully incorporated herein by reference for all purposes.

BACKGROUND

The disclosures herein relate in general to image processing, and in particular to a method and system for automatically counting physical objects.

For various purposes, it helps to automatically count a then-current number of physical objects in a particular area. In one example, for efficient operation of a building's heating, ventilation and air conditioning ("HVAC") systems, it helps to automatically count a then-current number of people in different rooms within the building (e.g., count with at least 80% accuracy). Nevertheless, high-resolution imaging sensors may impose substantial cost in hardware and power consumption. By comparison, low-resolution imaging sensors may fail to achieve a sufficient level of accuracy, especially if they fail to detect enough feature details (e.g., fail to count multiple people who are standing near, or in line with, one another).

SUMMARY

A periphery band is around an excluded region. For automatically counting physical objects within the periphery band and the excluded region, an imaging sensor captures: a first image of the periphery band and the excluded region; and a second image of the periphery band and the excluded region. In response to the first image, a first number is counted of physical objects within the periphery band and the excluded region. Relevant motion is automatically detected within the periphery band, while ignoring motion within the excluded region. In response to the second image, a second number is counted of physical objects within the periphery band and the excluded region. In response to determining that a discrepancy exists between the detected relevant motion and the second number, the discrepancy is handled.

DETAILED DESCRIPTION

Figure 1:
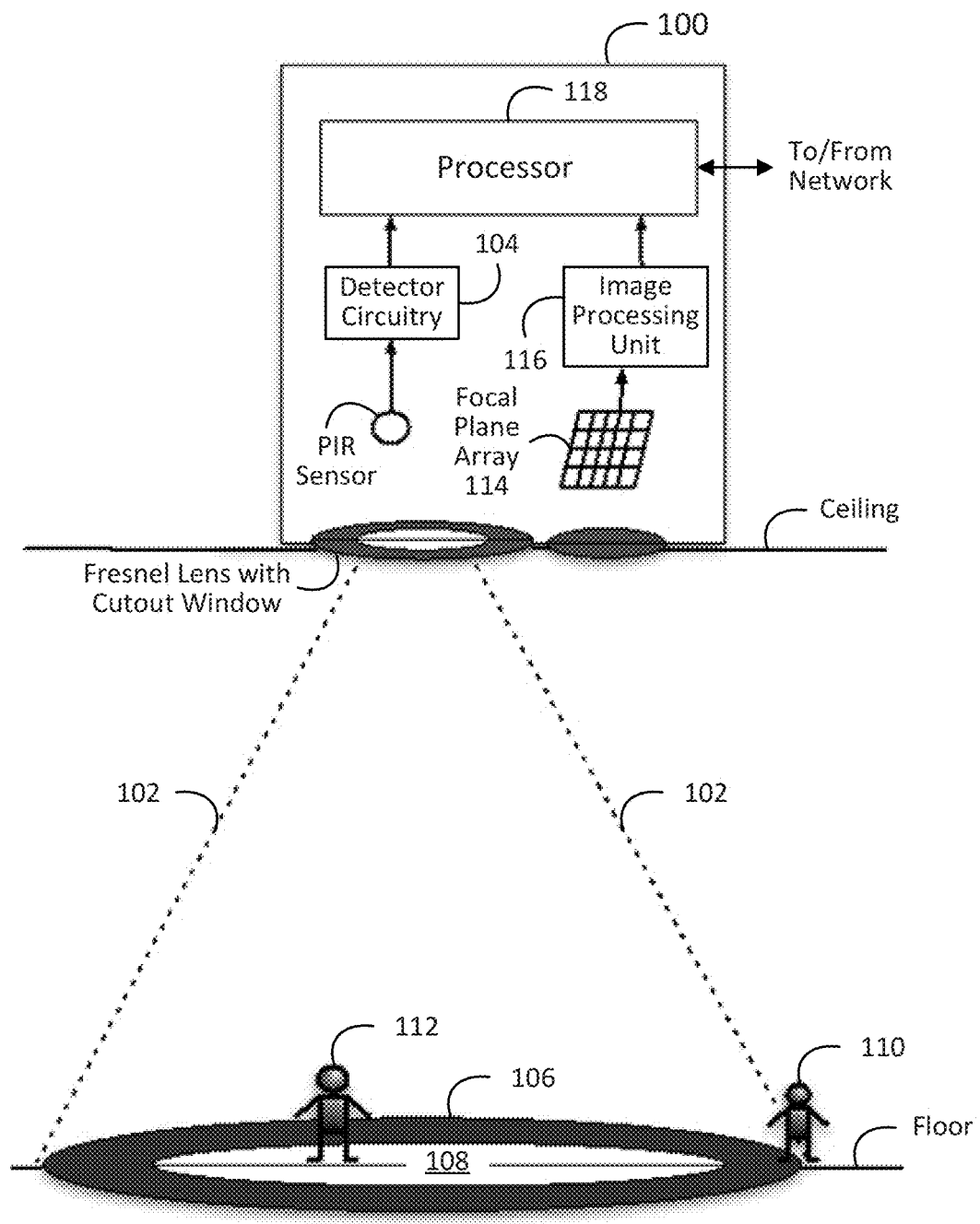
FIG. 1 is a block diagram of a system for automatically counting physical objects, according to the illustrative embodiments.

FIG. 1 is a block diagram of a system 100 for automatically counting physical objects, according to the illustrative embodiments. The system 100 includes a pyroelectric infrared ("PIR") sensor, which: (a) measures infrared light that radiates from a zone 102 within the PIR sensor's field of view, while ignoring motion outside the zone 102 (e.g., outside the PIR sensor's field of view, and thereby excluded from the zone 102); and (b) in response thereto, outputs signals that represent such measurements.

Detector circuitry 104: (a) receives those signals from the PIR sensor; and (b) in response to those signals, automatically detects then-current relevant motion (if any) of physical objects within the zone 102. For example, by detecting thermal motion, the PIR sensor and the detector circuitry 104 (in combination) more readily distinguish people from inanimate objects. Together, the PIR sensor and the detector circuitry 104 form a detector.

In the example of FIG. 1: (a) the system 100 is physically mounted in a ceiling of a room, which has a floor; (b) a Fresnel lens of the PIR sensor is modified to have a cutout window, so that the zone 102 is shaped as a hollow cone, which projects onto the floor as a flat periphery band 106 around an excluded region 108; and (c) accordingly, the detector circuitry 104 automatically detects then-current relevant motion (if any) of a person 110 within the periphery band 106, while ignoring motion of a person 112 within the excluded region 108 (which is excluded from the periphery band 106).

Further, the system 100 includes a focal plane array 114, which operates as an imaging sensor (e.g., camera), such as a thermal imaging sensor or a visible light imaging sensor. The array 114: (a) views a scene of the room (e.g., including its foreground, background, and physical objects therein); (b) captures and digitizes images of such views; and (c) outputs those digitized (or "digital") images to an image processing unit 116. The image processing unit 116 receives and analyzes those images to identify and count a number of relevant physical objects (e.g., people) within combined areas of the periphery band 106 and the excluded region 108.

The image processing unit 116 outputs its count of such number of relevant physical objects to a processor 118 (e.g., one or more microprocessors, microcontrollers and/or digital signal processors). The processor 118 receives such count and operates in response thereto, as discussed hereinbelow in connection with FIG. 2. In one example, the processor 118: (a) is a general purpose computational device for executing instructions of computer-readable software programs to process data (e.g., a database of information) and perform additional operations (e.g., communicating information) in response thereto; and (b) includes its own non-transitory computer-readable media (e.g., cache memories) for storing those computer-readable software programs and other information.

Optionally, the processor 118 is coupled to a network. In one example, such network is a Transport Control Protocol/Internet Protocol ("TCP/IP") network (e.g., the Internet or an intranet). By transferring (e.g., outputting and receiving) information (e.g. instructions, data, signals) between the processor 118 and such network (e.g., wirelessly or through a USB interface), the processor 118 is operable to communicate with other devices (e.g., HVAC systems) and vice versa.

In response to the detector circuitry 104 detecting then-current relevant motion of one or more physical objects within the zone 102, the detector circuitry 104 outputs a detection signal to the processor 118. The processor 118 receives the detection signal and operates in response thereto, as discussed hereinbelow in connection with FIG. 2. Further, the processor 118 outputs commands to the image processing unit 116, which receives and executes those commands. For example, in response to suitable ones of those commands (which the array 114 receives via the image processing unit 116), the array 114 adjusts its resolution and/or frequency of capturing and digitizing images, which helps to reduce power consumption.

Figure 2:
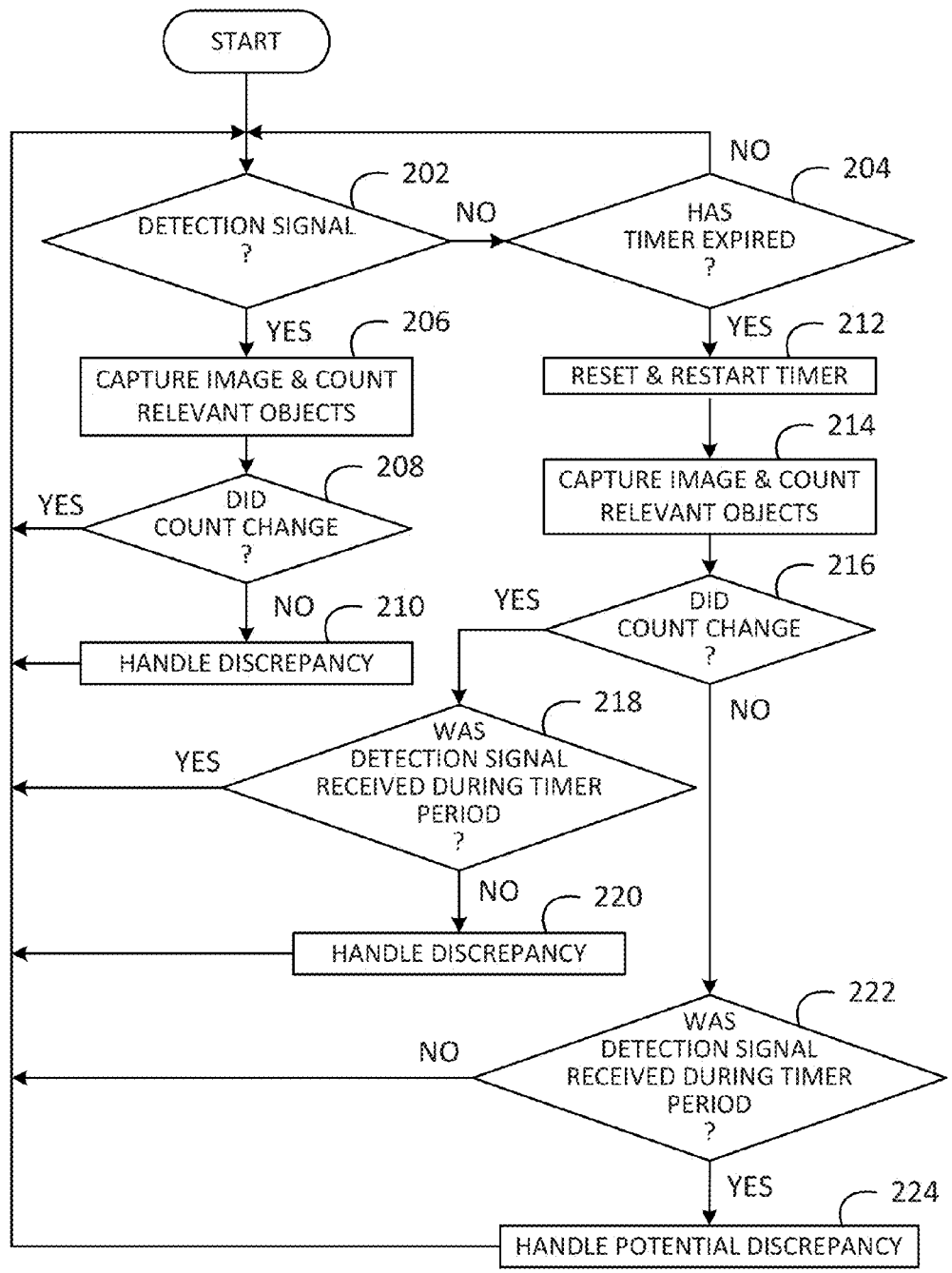
FIG. 2 is a flowchart of an operation performed by a processor of the system of FIG. 1.

FIG. 2 is a flowchart of an operation performed by the processor 118. At a step 202, the processor 118 determines whether it has received a detection signal from the detector circuitry 104 during a then-current timer period (e.g., after start, yet before expiration, of a timer operated by the processor 118). In response to the processor 118 determining that it has not received the detection signal during the then-current timer period, the operation continues from the step 202 to a step 204. At the step 204, the processor 118 determines whether the timer has expired. In response to the processor 118 determining that the timer has not yet expired, the operation returns from the step 204 to the step 202.

At the step 202, in response to the processor 118 determining that it has received the detection signal before such expiration, the operation continues from the step 202 to a step 206. At the step 206, the processor 118 outputs suitable commands to the image processing unit 116 for causing: (a) the array 114 to capture and digitize an image of its view; and (b) the image processing unit 116 to receive and analyze such image for identifying and counting a number of relevant physical objects within combined areas of the periphery band 106 and the excluded region 108.

At a next step 208, the processor 118: (a) receives the new count (of such number of relevant physical objects) from the image processing unit 116; and (b) determines whether the new count has changed versus an immediately preceding count. In response to the processor 118 determining that the new count has changed versus the immediately preceding count, the processor 118 accepts the new count as being correct, and the operation returns from the step 208 to the step 202. Conversely, in response to the processor 118 determining that the new count has not changed versus the immediately preceding count, the operation continues from the step 208 to a step 210.

At the step 210, the processor 118 handles a discrepancy that exists between the detection signal and the new count. Such discrepancy exists because the processor 118 received the detection signal from the detector circuitry 104 (thereby triggering performance of the steps 206 and 208), yet the new count has not changed versus the immediately preceding count. After the step 210, the operation returns to the step 202.

Referring again to the step 204, in response to the processor 118 determining that the timer has expired, the operation continues from the step 204 to a step 212. At the step 212, the processor 118 resets and restarts the timer. At a next step 214, the processor 118 outputs suitable commands to the image processing unit 116 for causing: (a) the array 114 to capture and digitize an image of its view; and (b) the image processing unit 116 to receive and analyze such image for identifying and counting a number of relevant physical objects within combined areas of the periphery band 106 and the excluded region 108.

At a next step 216, the processor 118: (a) receives the new count (of such number of relevant physical objects) from the image processing unit 116; and (b) determines whether the new count has changed versus an initial count that existed when the timer was started. In response to the processor 118 determining that the new count has changed versus the initial count, the operation continues from the step 216 to a step 218.

At the step 218, the processor 118 determines whether it had received a detection signal from the detector circuitry 104 during the expired timer period (whose expiration triggered performance of the step 214). In response to the processor 118 determining that it had received the detection signal from the detector circuitry 104 during the expired timer period, the processor 118 accepts the new count as being correct, and the operation returns from the step 218 to the step 202. Conversely, in response to the processor 118 determining that it did not receive the detection signal from the detector circuitry 104 during the expired timer period, the operation continues from the step 218 to a step 220.

At the step 220, the processor 118 handles a discrepancy that exists between the detection signal and the new count. Such discrepancy exists because the new count has changed versus the initial count, yet the processor 118 did not receive the detection signal from the detector circuitry 104 during the expired timer period (thereby indicating that the detector circuitry 104 automatically detected complete absence of relevant motion within the periphery band 106 during the expired timer period). After the step 220, the operation returns to the step 202.

Referring again to the step 216, in response to the processor 118 determining that the new count has not changed versus the initial count, the operation continues from the step 216 to a step 222. At the step 222, the processor 118 determines whether it had received a detection signal from the detector circuitry 104 during the expired timer period (whose expiration triggered performance of the step 214). In response to the processor 118 determining that it did not receive the detection signal from the detector circuitry 104 during the expired timer period, the processor 118 accepts the new count (which, at the step 222, is the same as the initial count) as being correct, and the operation returns from the step 222 to the step 202.

Conversely, in response to the processor 118 determining that it had received the detection signal from the detector circuitry 104 during the expired timer period, the operation continues from the step 222 to a step 224. At the step 224, the processor 118 handles a potential discrepancy that exists between the detection signal and the new count. Such potential discrepancy exists because the new count has not changed versus the initial count, yet the processor 118 had received the detection signal from the detector circuitry 104 during the expired timer period. After the step 224, the operation returns to the step 202.

The processor 118 handles the discrepancy (at the steps 210 and 220) and the potential discrepancy (at the step 224) in a programmable manner, which may either vary or be the same between the steps 210, 220 and 224. In one example, the processor handles the discrepancy at the step 210 by suitably adjusting the PIR sensor's sensitivity threshold. In another example, the processor handles the discrepancy at the step 220 by simply discarding the new count and continuing to accept the initial count as being correct, so that the new count is discarded if the processor 118 did not receive the detection signal from the detector circuitry 104 during the expired timer period. In yet another example, the processor handles the discrepancy at the steps 220 and 224 by: (a) suitably adjusting the PIR sensor's sensitivity threshold; (b) suitably adjusting a resolution, a power consumption, a pixel sensitivity threshold (e.g., minimum detectable object size), and/or a number of counting iterations of the focal plane array 114 and/or of the image processing unit 116; and/or (c) adjusting the timer period (e.g., between 30 seconds and 60 seconds), and repeating the step 212.

In that manner, the PIR sensor helps to robustify the count from the image processing unit 116, so that the system 100 achieves sufficient robustness at lower cost with less power (e.g., within relatively a low energy budget, such as a few microwatts, which is suitable for powering by energy harvesting or battery).

Figure 3:
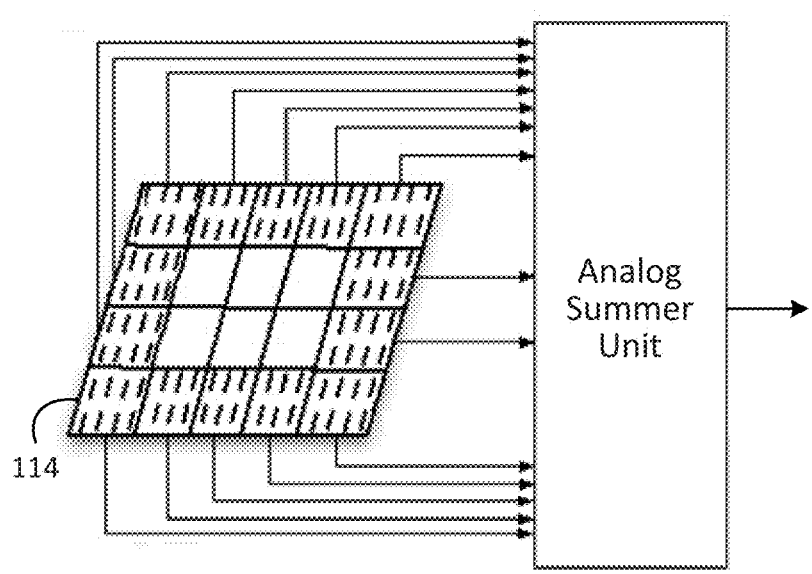
FIG. 3 is a block diagram of a focal plane array of the system of FIG. 1 coupled to an analog summer unit, according to an alternative embodiment.

FIG. 3 is a block diagram of the array 114 (FIG. 1) coupled (e.g., connected) to an analog summer unit, according to an alternative embodiment. In this alternative embodiment, the PIR sensor is replaced by the analog summer unit. As shown in FIG. 3, various periphery band pixels of the array 114 are coupled to the analog summer unit, which receives analog signals from those periphery band pixels. Referring also to FIG. 1, those periphery band pixels aggregately capture images of the periphery band 106 (e.g., which may have a rectangular shape in this alternative embodiment), while other (non-periphery band) pixels of the array 114 aggregately capture images of the excluded region 108.

From the analog summer unit, the detector circuitry 104: (a) receives a sum of those analog signals; and (b) in response to the sum, detects then-current relevant motion (if any) of physical objects within the periphery band 106, while ignoring motion within the excluded region 108. In response to the detector circuitry 104 detecting such then-current relevant motion, the detector circuitry 104 outputs the detection signal to the processor 118. For this alternative embodiment, examples of the detector circuitry 104 include: (a) an energy (e.g., threshold) detector; and (b) a derivative (e.g., dx/dt) detector. For clarity, FIGS. 1 and 3 are not necessarily drawn to scale.

Although illustrative embodiments have been shown and described by way of example, a wide range of alternative embodiments is possible within the scope of the foregoing disclosure.

What is claimed is:

1. A method performed by a system for automatically counting physical objects within a periphery band and an excluded region, wherein the periphery band is around the excluded region, the method comprising:
    with an imaging sensor, capturing a first image of the periphery band and the excluded region;
    in response to the first image, counting a first number of physical objects within the periphery band and the excluded region;
    with a detector, automatically detecting relevant motion within the periphery band, while ignoring motion within the excluded region;
    with the imaging sensor, capturing a second image of the periphery band and the excluded region;
    in response to the second image, counting a second number of physical objects within the periphery band and the excluded region; and
    in response to determining that a discrepancy exists between the detected relevant motion and the second number, handling the discrepancy.

2. The method of claim 1, wherein handling the discrepancy includes:
    adjusting a sensitivity threshold of automatically detecting relevant motion within the periphery band.

3. The method of claim 1, wherein capturing the first image precedes capturing the second image, and wherein handling the discrepancy includes:
    in response to automatically detecting complete absence of relevant motion within the periphery band during a period between capturing the first and second images, accepting the first number as being correct.

4. The method of claim 1, wherein handling the discrepancy includes:
    adjusting at least one of: a resolution; a power consumption; a pixel sensitivity threshold; and a number of iterations for counting physical objects within successive images of the periphery band and the excluded region.

5. The method of claim 1, wherein handling the discrepancy includes:
    adjusting a period between capturing successive images of the periphery band and the excluded region.

6. The method of claim 1, wherein the detector includes a pyroelectric infrared ("PIR") sensor, and wherein automatically detecting relevant motion within the periphery band includes:
    with the PIR sensor, automatically detecting relevant motion within the periphery band, wherein a Fresnel lens of the PIR sensor has a cutout window for ignoring motion within the excluded region.

7. The method of claim 1, wherein the imaging sensor is a visible light imaging sensor.

8. The method of claim 1, wherein the imaging sensor includes a focal plane array having periphery band pixels and other pixels.

9. The method of claim 8, wherein automatically detecting relevant motion within the periphery band includes:
    in response to signals from the periphery band pixels, automatically detecting relevant motion within the periphery band, while ignoring motion within the excluded region.

10. A system for automatically counting physical objects within a periphery band and an excluded region, wherein the periphery band is around the excluded region, the system comprising:
    an imaging sensor to: capture a first image of the periphery band and the excluded region; and capture a second image of the periphery band and the excluded region;
    an image processing unit, coupled to the imaging sensor, to: receive the first and second images from the imaging sensor; in response to the first image, count a first number of physical objects within the periphery band and the excluded region; and, in response to the second image, count a second number of physical objects within the periphery band and the excluded region;
    a detector to automatically detect relevant motion within the periphery band, while ignoring motion within the excluded region; and
    a device, coupled to the image processing unit and to the detector, to handle a discrepancy in response to determining that the discrepancy exists between the detected relevant motion and the second number.

11. The system of claim 10, wherein to handle the discrepancy includes:
    adjusting a sensitivity threshold of automatically detecting relevant motion within the periphery band.

12. The system of claim 10, wherein to capture the first image precedes capturing the second image, and wherein to handle the discrepancy includes:
    in response to automatically detecting complete absence of relevant motion within the periphery band during a period between capturing the first and second images, accepting the first number as being correct.

13. The system of claim 10, wherein to handle the discrepancy includes:
    adjusting at least one of: a resolution; a power consumption; a pixel sensitivity threshold; and a number of iterations for counting physical objects within successive images of the periphery band and the excluded region.

14. The system of claim 10, wherein to handle the discrepancy includes:
adjusting a period between capturing successive images of the periphery band and the excluded region.

15. The system of claim 10, wherein the detector includes:
a pyroelectric infrared ("PIR") sensor to automatically detect relevant motion within the periphery band, wherein a Fresnel lens of the PIR sensor has a cutout window for ignoring motion within the excluded region.

16. The system of claim 10, wherein the imaging sensor is a visible light imaging sensor.

17. The system of claim 10, wherein the imaging sensor includes a focal plane array having periphery band pixels and other pixels.

18. The system of claim 17, wherein to automatically detect relevant motion within the periphery band includes:
in response to signals from the periphery band pixels, automatically detecting relevant motion within the periphery band, while ignoring motion within the excluded region.

\* \* \* \* \*